US012019398B2

(12) United States Patent
Hernandez et al.

(10) Patent No.: US 12,019,398 B2
(45) Date of Patent: Jun. 25, 2024

(54) ELASTIC SECURING ORGAN FOR FASTENING A HOROLOGICAL COMPONENT ON A SUPPORT ELEMENT

(71) Applicant: Nivarox-FAR S.A., Le Locle (CH)

(72) Inventors: Ivan Hernandez, Cressier (CH); Pierre Cusin, Villars-Burquin (CH)

(73) Assignee: Nivarox—FAR S.A., Le Locle (CH)

( * ) Notice: Subject to any disclaimer, the term of this patent is extended or adjusted under 35 U.S.C. 154(b) by 486 days.

(21) Appl. No.: 17/311,837

(22) PCT Filed: Dec. 9, 2019

(86) PCT No.: PCT/EP2019/084224
§ 371 (c)(1),
(2) Date: Jun. 8, 2021

(87) PCT Pub. No.: WO2020/126616
PCT Pub. Date: Jun. 25, 2020

(65) Prior Publication Data
US 2022/0019176 A1 Jan. 20, 2022

(30) Foreign Application Priority Data
Dec. 17, 2018 (EP) .................................... 18212866

(51) Int. Cl.
*G04B 17/34* (2006.01)

(52) U.S. Cl.
CPC .................................. *G04B 17/345* (2013.01)

(58) Field of Classification Search
CPC .............................. G04B 17/345; G04B 17/34
See application file for complete search history.

(56) References Cited

U.S. PATENT DOCUMENTS

2008/0112276 A1* 5/2008 Bitterli ................. G04B 19/042 368/322
2008/0113154 A1* 5/2008 Bitterli ................. G04B 13/021 428/131
2013/0047437 A1* 2/2013 Daout .................. G04B 17/345 403/345

FOREIGN PATENT DOCUMENTS

CH 698 794 B1 10/2009
CH 698794 B1 * 10/2009 ........... G04B 13/022
(Continued)

OTHER PUBLICATIONS

Japanese Office Action dated Jun. 14, 2022 in Japanese Patent Application No. 2021-532400 (with English translation), 11 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An elastic securing organ for fastening a horological component on a support element including an outer peripheral wall capable of being connected to said horological component and an inner peripheral wall defining a triangular-shaped opening wherein the support element is capable of being inserted, the elastic securing organ includes elastic arms each forming one side of the triangular opening and helping ensure the gripping of the support element in the opening, each arm including: at least one cut-out defined completely or partially along the body of said arm, an elastic contact zone with the support element, and elastic peripheral zones which extend between this contact zone and the ends of this elastic arm, the contact zone having a greater quantity of material than the quantity of material forming each of the peripheral zones thereof.

18 Claims, 3 Drawing Sheets

(56) References Cited

FOREIGN PATENT DOCUMENTS

| | | | | |
|---|---|---|---|---|
| CH | 700811 | B1 * | 10/2010 | ........... G04B 13/022 |
| CN | 102893224 | A | 1/2013 | |
| CN | 103930837 | A | 7/2014 | |
| CN | 105629697 | A | 6/2016 | |
| CN | 107942639 | A | 4/2018 | |
| EP | 1 637 940 | A2 | 3/2006 | |
| EP | 1 921 518 | A1 | 5/2008 | |
| EP | 3 309 625 | A1 | 4/2018 | |
| JP | 2008-122384 | A | 5/2008 | |

OTHER PUBLICATIONS

International Search Report dated Mar. 6, 2020 in PCT/EP2019/084224 filed on Dec. 9, 2019, 2 pages.
Combined Chinese Office Action and Search Report dated Jan. 13, 2022 in Chinese Patent Application No. 201980083413.1 (with English translation), 13 pages.

* cited by examiner

ELASTIC SECURING ORGAN FOR FASTENING A HOROLOGICAL COMPONENT ON A SUPPORT ELEMENT

FIELD OF THE INVENTION

The invention relates to an elastic securing organ for fastening a horological component on a support element.

The invention also relates to an elastic securing organ-horological component unit and an assembly of such a unit with the support element.

The invention further relates to a horological movement comprising at least such an assembly.

The invention also relates to a timepiece comprising such a movement.

BACKGROUND OF THE INVENTION

In the prior art, elastic securing organs are known such as horological collets which take part in balance-spring assemblies on balance rods in a horological movement, by elastic gripping.

However, such elastic securing organs have the major drawback of requiring in the context of producing such assemblies complex, time-consuming and costly mounting operations due to the fact that these organs have holding torques on these balance rods which are low and limited.

SUMMARY OF THE INVENTION

The aim of the present invention is to completely or partially remedy the drawbacks cited above by providing an elastic securing organ which has a high holding torque particularly to facilitate/simplify the mounting operations of an assembly of an elastic securing organ-horological component unit with a support element.

For this purpose, the invention relates to an elastic securing organ for fastening a horological component on a support element comprising an outer peripheral wall capable of being connected to said horological component and an inner peripheral wall defining a triangular-shaped opening wherein the support element is capable of being inserted, said elastic securing organ comprising elastic arms each forming one side of the triangular opening and helping ensure the gripping of the support element in the opening, each arm comprising:

- at least one cut-out defined completely or partially along the body of said arm,
- an elastic contact zone or elastic contact portion of the arm, capable of cooperating with said support element particularly to help ensure the gripping of this support element in the opening, and
- elastic peripheral zones or elastic peripheral portions of said arm, which extend between this contact zone and the ends of this elastic arm, the contact zone having a greater quantity of material than the quantity of material forming each of the peripheral zones thereof.

Thus, thanks to these features, the elastic securing organ is then capable of withstanding substantial elastic gripping and therefore storing a large quantity of elastic energy when it is constrained in order to restore a high holding torque, particularly thanks to a high rigidity of this elastic securing organ induced particularly by substantial volumes (or quantities) of material forming the rigid arms thereof which comprise the inner and outer structures. It will be noted that these substantial volumes of material are more specifically comprised in the contact zones which are placed under loads (or under strains) during the insertion of the support element into this securing organ.

Furthermore, it will be noted that this elastic securing organ is configured so that this storing of elastic energy results in admissible strains in relation to the material forming such a securing organ such as silicon.

In further embodiments:

- the contact zone comprises at least two particularly inclined beams arranged in a main cut-out of said at least one cut-out defined completely or partially along the body of the elastic arm;
- said at least two beams connected the inner and outer structures with one another;
- the main cut-out has an essentially semi-circular shape;
- the main cut-out is divided into at least three crossed-out parts by said at least two beams;
- at least two crossed-out parts from said at least three crossed-out parts have substantially similar volumes;
- the crossed-out part comprised entirely in the contact zone has a volume which is substantially less than that of the other crossed-out parts of the main cut-out;
- said at least three crossed-out parts have substantially similar volumes;
- central axes of the beams form acute angles with a longitudinal axis of the elastic arm;
- the elastic securing organ comprises a single cut-out which is a main cut-out;
- elastic securing organ comprises a main cut-out and additional cut-out defined at the ends of this main cut-out;
- the outer and inner structures have different shapes;
- the outer and inner structures have respectively essential circular and triangular shapes;
- the elastic securing organ comprises an attachment point with the horological component;
- the elastic securing organ is a collet for fastening the horological component such as a balance-spring to a support element such as a balance rod, and
- the elastic securing organ is made of a silicon-based material.

The invention also relates to an elastic securing organ-horological component unit for a horological movement of a timepiece comprising such an elastic securing organ.

Advantageously, this unit is one-piece.

The invention also relates to an assembly for a horological movement of a timepiece comprising such an elastic securing organ-horological component unit, said unit being fastened to a support element.

The invention also relates to a horological movement comprising at least such an assembly.

The invention also relates to a timepiece comprising such a horological movement.

BRIEF DESCRIPTION OF THE DRAWINGS

Further specificities and advantages will emerge clearly from the description given hereinafter, which is by way of indication and in no way limiting, with reference to the appended drawings, wherein.

DETAILED DESCRIPTION OF PREFERRED EMBODIMENTS

Figure 1:
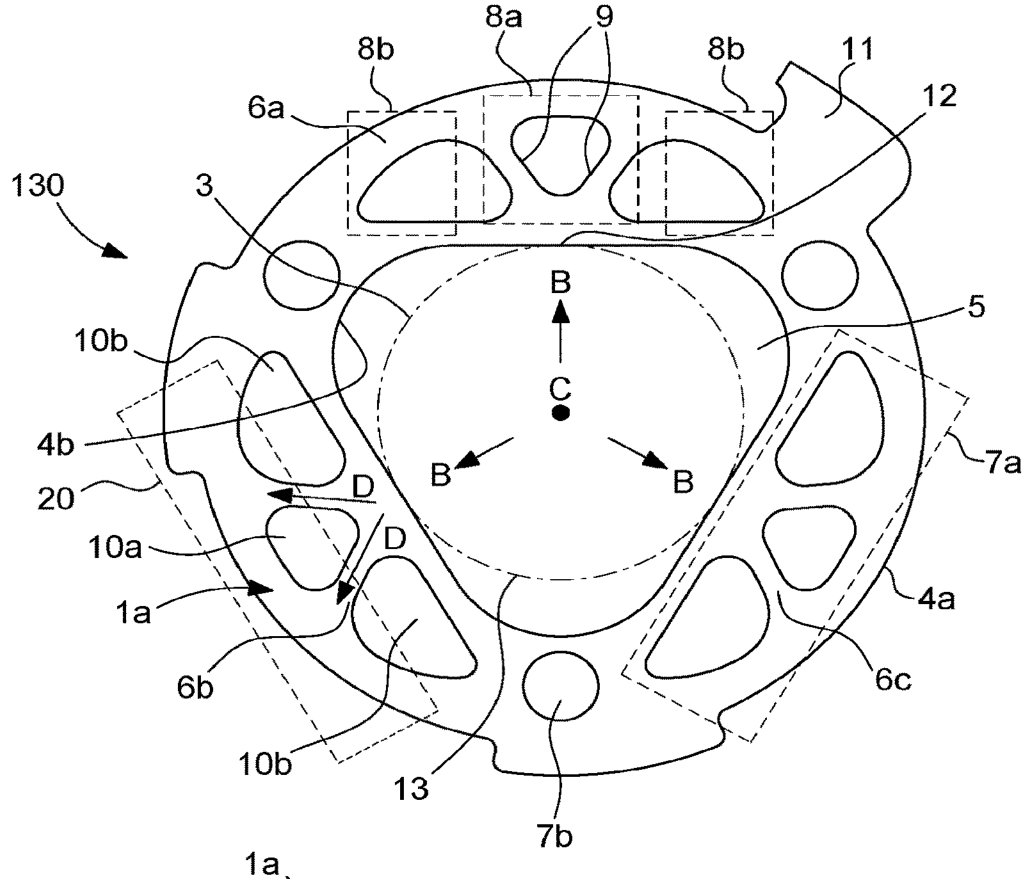
FIG. 1 is a perspective view of an elastic securing organ for fastening a horological component onto a support element which is here in a strained state, according to a first embodiment of the invention.

FIGS. 1 to 5 show several embodiments of the elastic securing organ 1*a*, 1*b*, 1*c* for fastening a horological component 2 on a support element 3. By way of example, the elastic securing organ 1*a*, 1*b*, 1*c* can be a collet for fastening the horological component 2 such as a balance-spring to a support element 3 such as a balance rod.

In these embodiments, this elastic securing organ 1*a*, 1*b*, 1*c* can be comprised in an elastic securing organ-horological component unit 120 provided for a horological movement 110 of a timepiece 100. Such a unit 120 can be a one-piece part made of a so-called "fragile" material based for example on silicon. In further alternative embodiments, this material can be based on quartz or corundum or more generally ceramic.

It will be noted that in an alternative embodiment of this unit, only the elastic securing organ can be made of such a so-called "fragile" material, the horological component being then manufactured from another material.

This unit 120 can be part of an assembly 130 for the horological movement 110, by being fastened to the support element 3 for example by elastic gripping. It will be noted that this assembly 130 has been devised for applications in the horological field. However, the invention can perfectly be implemented in other fields such as aeronautics, jewelry, or the automotive field.

Such an elastic securing organ 1*a*, 1*b*, 1*c* comprises preferably planar top and bottom faces as well as outer and inner peripheral walls 4*a*, 4*b*. These outer and inner peripheral walls 4*a*, 4*b* which are also respectively referred to as outer and inner structures 4*a*, 4*b*, have different shapes. More specifically, in the case of the outer structure 4*a* or outer peripheral wall 4*a*, it preferably has an essentially circular shape. Such an outer structure 4*a* or outer peripheral wall 4*a*, is intended to be connected to the horological component 2 comprising at least one attachment point 11 provided to be connected to this horological component 2. This attachment point 11 preferably protrudes from this outer peripheral wall 4*a*. Regarding the inner structure 4*b* or inner peripheral wall 4*b*, it has/describes an essentially triangular shape particularly a shape of an equilateral triangle. This inner structure 4*b* or inner peripheral wall 4*b* of this elastic securing organ 1*a*, 1*b*, 1*c* helps define an opening 5, particularly of triangular shape, wherein the support element 3 is intended to be inserted.

The elastic securing organ 1*a*, 1 *b*, 1*c* also includes elastic arms 6*a*, 6*b*, 6*c* in particular three elastic arms 6*a*, 6*b*, 6*c*. These arms 6*a*, 6*b*, 6*c* comprise in a non-limiting and non-exhaustive manner:

inner faces comprised in the inner peripheral wall 4*b* of the elastic securing organ 1*a*, 1*b*, 1*c* and, said inner faces defining/forming together this wall 4*b* and therefore also the opening 5 of this securing organ 1*a*, 1*b*, 1*c*, and outer faces comprised in the outer peripheral wall 4*a* of the elastic securing organ 1*a*, 1*b*, 1 *c* and, said inner faces defining/forming this wall 4*a* of this securing organ 1*a*, 1*b*, 1 *c*.

It is therefore understood that in this elastic securing organ 1*a*, 1*b*, 1*c*, such elastic arms 6*a*, 6*b*, 6*c* therefore each comprise a part of the top, bottom, inner and outer faces of the elastic organ 1*a*, 1 *b*, 1*c*. Each arm 6*a*, 6*b*, 6*c* is a part of elongate or substantially elongate shape, corresponding to a side of the triangle formed by the opening 5. In other words, each arm extends longitudinally or substantially longitudinally between two apexes of the triangle formed by the opening 5. In this elastic securing organ 1*a*, 1*b*, 1*c*, these elastic arms 6*a*, 6*b*, 6*c* essentially make it possible to carry out the elastic gripping of the support element 3 in the opening 5.

In this configuration, each arm 6*a*, 6*b*, 6*c* comprises at least one cut-out 7*a*, 7*b*, 7*c* distributed completely or partially along the body of said arm. Furthermore, it comprises an elastic contact zone 8*a* as well as elastic peripheral zones extending between this contact zone 8*a* and ends of this elastic arm 6*a*, 6*b*, 6*c*. The elastic contact zone 8*a* is a portion of the elastic arm 6*a*, 6*b*, 6*c* which is provided to cooperate with a peripheral wall 13 of the support element 3. It is therefore understood that this elastic contact zone 8*a* can also be referred to as an elastic contact portion 8*a* of the elastic arm 6*a*, 6*b*, 6*c* or indeed elastic contact part 8*a* of the elastic arm 6*a*, 6*b*, 6*c*. Such an elastic contact portion 8*a* comprises top, bottom, inner and outer faces of a part of the corresponding arm 6*a*, 6*b*, 6*c*, said part being located between end parts of said arm 6*a*, 6*b*, 6*c*. Similarly, each elastic peripheral zone can also be named an elastic peripheral portion of the elastic arm 6*a*, 6*b*, 6*c* or indeed elastic peripheral part of this arm 6*a*, 6*b*, 6*c*. This portion comprises top, bottom, inner and outer faces of an end part of the corresponding arm 6*a*, 6*b*, 6*c*.

In each arm 6*a*, 6*b*, 6*c*, the peripheral zones 8*b*, or peripheral portions 8*b* of this arm 6*a*, 6*b*, 6*c*, are preferably juxtaposed at the contact zone 8*a*, or contact portion 8*a* of said arm 6*a*, 6*b*, 6*c*. Such a contact zone 8*a* comprises a contact interface 12 also referred to as "contact point" between the elastic arm 6*a*, 6*b*, 6*c* and the peripheral wall 13 of the support element 3. In this context, the elastic securing organ 1*a*, 1*b*, 1*c* then comprises three contact zones 8*a* which help carry out precise centring of the horological component 2, for example a balance-spring, in the horological movement 110. In this elastic securing organ 1*a*, 1*b*, 1*c*, each contact zone 8*a* has a quantity of material which is substantially greater than the quantity of material of the peripheral zones 8*b*. Such a configuration of the elastic arm 6*a*, 6*b*, 6*c* enables the elastic securing organ 1*a*, 1 *b*, 1*c* to store a greater quantity of elastic energy for the same gripping compared to the securing organs of the prior art. Such a quantity of elastic energy stored in the securing organ 1*a*, 1*b*, 1*c* then makes it possible to obtain a greater holding torque on the support element in the assembly 130 of the elastic securing organ-horological component unit 120 with this support element 3. In other words, such excess energy stored in the securing organ 1*a*, 1*b*, 1*c* therefore increases the holding torque. In addition, it will be noted that such a configuration of the elastic securing organ 1*a*, 1*b*, 1*c* makes it possible to store elastic energy ratios which are 6 to 8 times greater than those of the securing organs of the prior art.

In the different embodiments of the elastic securing organ 1a, 1 b, 1c, each arm 6a, 6b, 6c comprises a main cut-out 7a comprised in the cut-outs 7a, 7b, 7c that each arm 6a to 6c can comprise. This main cut-out 7a is preferably distributed completely or partially along the body of the elastic arm 6a, 6b, 6c. In other words, this main cut-out 7a which has essentially the shape of a semicircle has:

- a diameter which extends substantially parallel to the part of the inner peripheral wall comprised in each elastic arm 6a, 6b, 6c, and
- a radius which is substantially less than the greatest deviation between inner and outer faces of outer and inner peripheral walls 4a, 4b, forming an elastic arm 6a, 6b, 6c.

It will be noted in particular that this main cut-out 7a extends in the contact zone 8a as well as in the peripheral zones 8b of each elastic arm 6a, 6b, 6c.

The main cut-out 7a can be divided by at least two beams 9 into at least three crossed-out parts 10a, 10b. In these embodiments, the main cut-out 7a is divided by two beams 9 in three crossed-out parts 10a, 10b.

Figure 2:
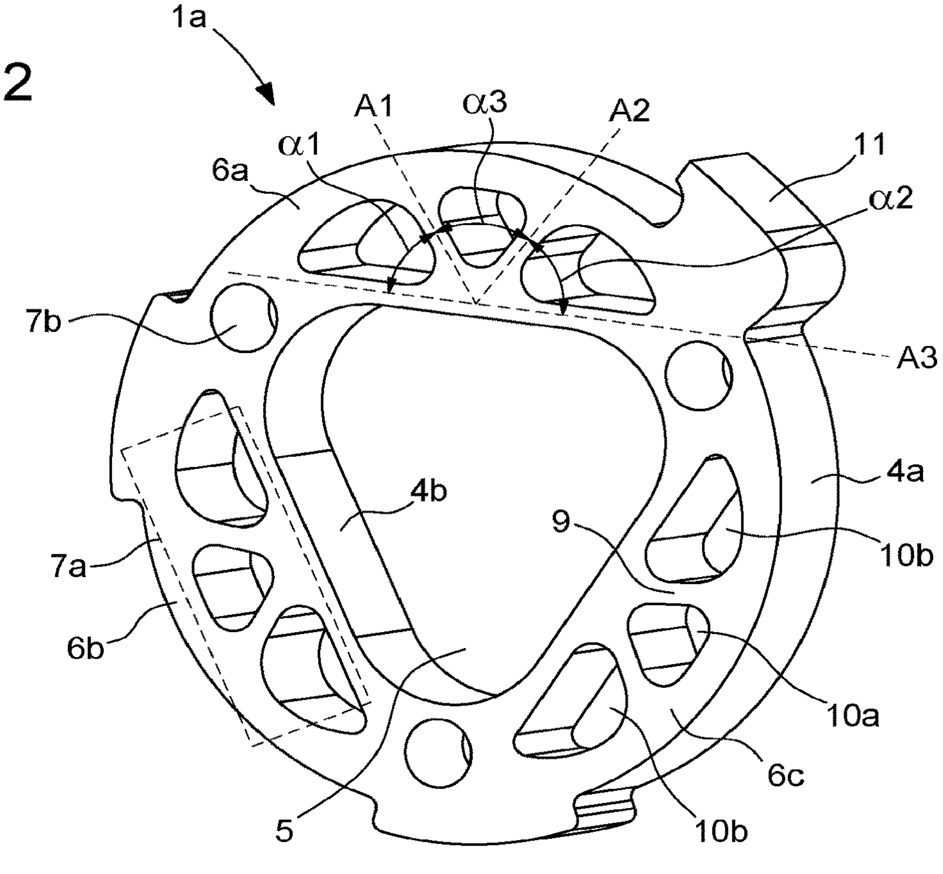
FIG. 2 is a perspective view of the elastic securing organ for fastening the horological component onto the support element which is here in a resting state, according to the first embodiment of the invention.
Figure 4:
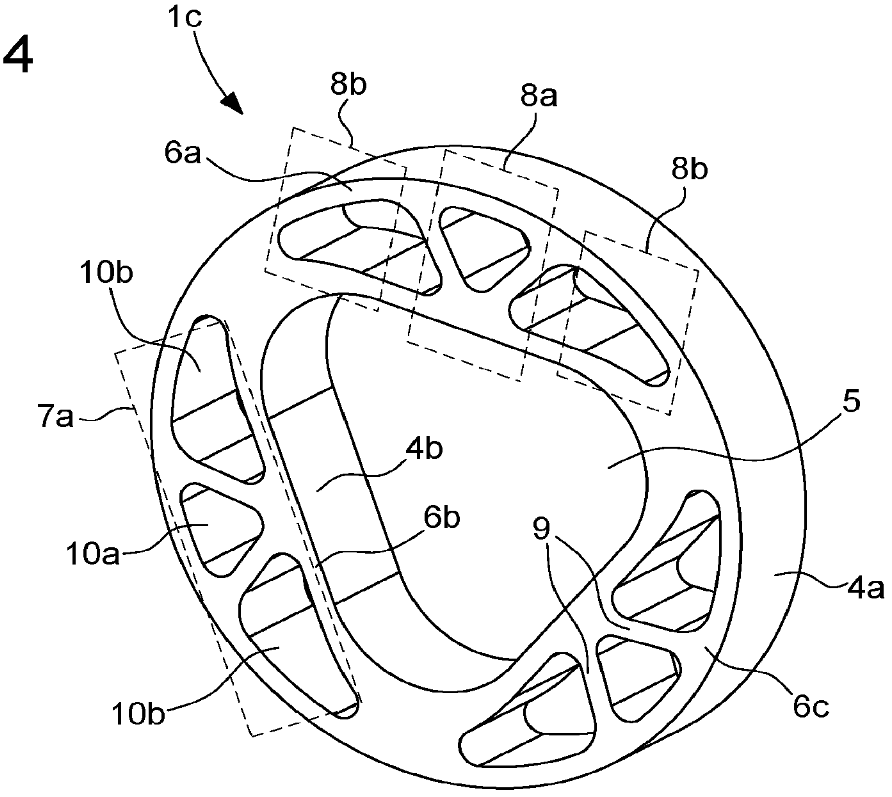
FIG. 4 is a perspective view of an elastic securing organ for fastening the horological component onto the support element, according to a third embodiment of the invention.
Figure 5:
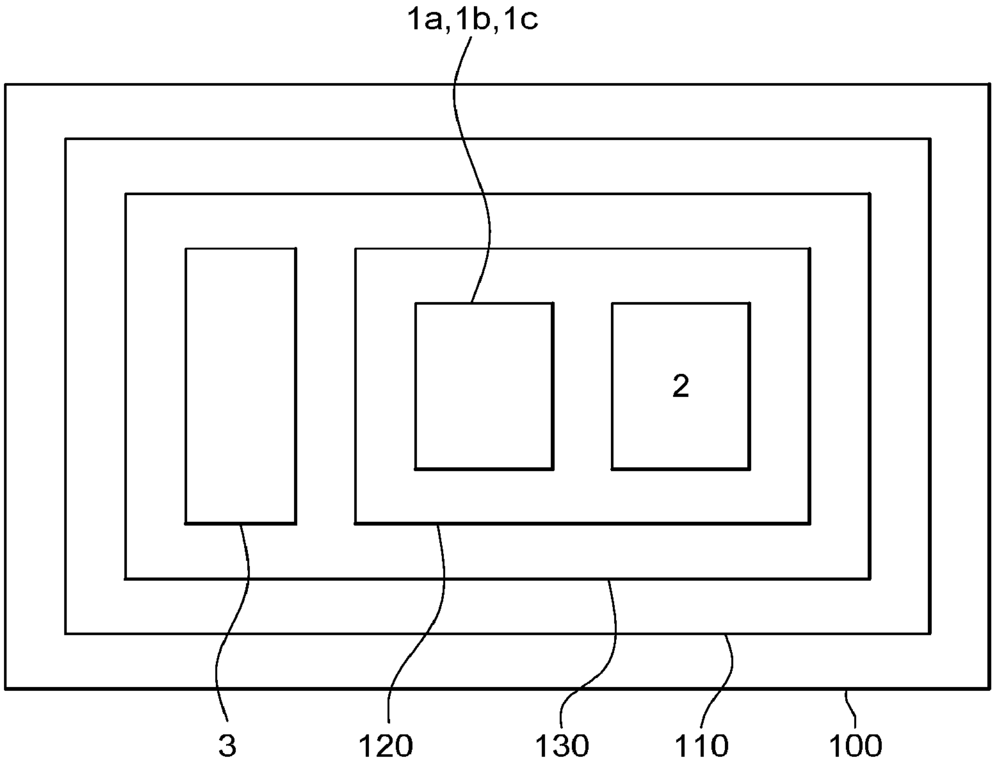
FIG. 5 is a schematic view of a timepiece provided with a horological movement comprising an assembly including the support element and an elastic securing organ-horological component unit, according to the embodiments of the invention.

In the first and third embodiments illustrated in FIGS. 1, 2 and 4, two crossed-out parts 10b from the three 10a, 10b have substantially similar volumes. It will be noted in respect of the third embodiment, that each elastic arm 6a, 6b, 6c comprises unlike the other embodiments a single cut-out which is the main cut-out 7a. In this context, the crossed-out part 10a comprised entirely in the contact zone 8a has a volume which is substantially less than that of the other crossed-out parts 10b of the main cut-out 7a.

Figure 3:
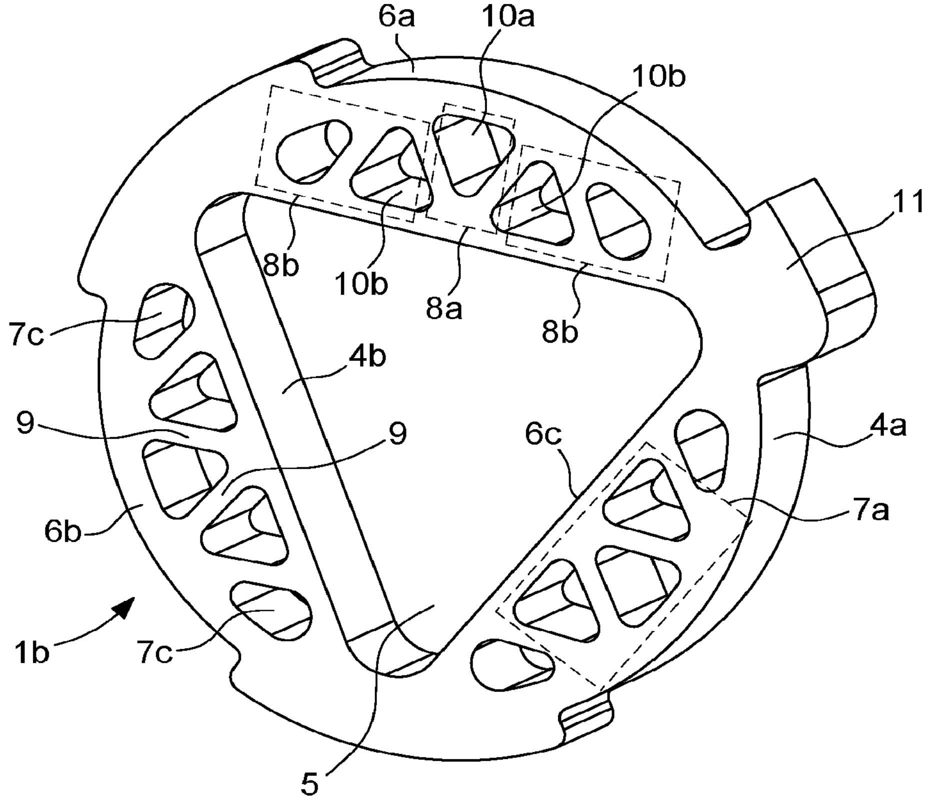
FIG. 3 is a perspective view of an elastic securing organ for fastening a horological component onto the support element, according to a second embodiment of the invention.

In the second embodiment, illustrated in FIG. 3, the three crossed-out parts 10a, 10b have substantially similar volumes and shapes particularly essentially triangular shapes.

In these different embodiments of the elastic securing organ 1a, 1b, 1C, it will be noted that the crossed-out part 10a entirely comprised in the contact zone 8a has essentially a triangular shape.

The beams 9 dividing the main cut-out 7a into crossed-out parts 10a, 10b are preferably inclined. In the different embodiments, these inclined beams 9 are two in number and are comprised in the contact zone 8a of each elastic arm 6a, 6b, 6c. These beams 9 helps interconnect the outer and inner peripheral walls 4a, 4b. Central axes A1, A2 of the beams 9 form acute angles α1, α2 with a longitudinal axis A3 of the elastic arm 6a, 6b, 6c. It will be noted that this longitudinal axis A3 extends along the greatest dimension of this arm 6a, 6b, 6c. Such angles α1, α2 can be substantially similar and then between 45 and 70 degrees, and are preferably 55 degrees.

The central axes A1, A2 of the beams 9 also form an acute angle α3 with one another. Such an angle α3 can be between 40 and 90 degrees, and is preferably 70 degrees.

This elastic securing organ 1a, 1b can comprise additional cut-outs 7b, 7c making it possible to adjust the elasticity of the arms 6a, 6b, 6c of such an organ 1a, 1b. For example in the first embodiment, the elastic securing organ 1a comprises three additional cut-outs 7b of essentially circular shape which are located in each end of each elastic arm 6a, 6b, 6c. In a further example, the second embodiment of the securing organ 1b comprises in each elastic arm 6a, 6b, 6c two additional cut-outs 7c limiting the main cut-out 7a and which are defined at the ends of this main cut-out 7a. In other words, these two additional cut-outs 7c are respectively comprised in the two peripheral zones of each elastic arm 6a, 6b, 6c.

The invention also relates to a method for carrying out the assembly 130 of the elastic securing organ-horological component unit 120 with the support element 3. This method comprises a step of fastening the elastic securing organ-horological component unit 120 with the support element 3. During this step, the support element 3 is inserted into the opening 5 of the elastic securing organ 1a, 1 b, 1c. During this insertion, portions of the peripheral wall 13 of the support element 3 come into contact with the contact interfaces 12 of the elastic arms 6a, 6b, 6c. Such an insertion then gives rise to a deformation of the elastic arms 6a, 6b, 6c along a radial direction B with respect to a central axis C of the support element 3, under the action of a strain force exerted by these portions on the contact interfaces 12. The effect created by this insertion can be seen in FIG. 1 which relates to the first embodiment of the elastic securing organ 1a which is in a strained state. This deformation of the elastic arms 6a, 6b, 6c is essentially carried out in the contact zones 8a of these arms 6a, 6b, 6c. In these contact zones 8a, the inclined beams 9 which act as a stiffening element of these arms 6a, 6b, 6c help place an outer portion 20 of the collet seen in FIG. 1 under strain/tension when this collet is mounted on the axis participating in elastic gripping. In this context, it will be noted that these beams are subjected to compression particularly along the direction of the arrows D seen in FIG. 1. Thus in such a state of strain, the elastic securing organ 1a, 1b, 1c stores a large quantity of elastic energy which helps it provide a substantial holding torque particularly allowing optimal colleting by elastic gripping.

The invention claimed is:

1. An elastic securing organ for fastening a horological component on a support element comprising an outer peripheral wall capable of being connected to said horological component and an inner peripheral wall defining a triangular-shaped opening wherein the support element is capable of being inserted, said elastic securing organ comprising elastic arms each forming one side of the triangular opening and helping ensure the gripping of the support element in the opening, each arm comprising:

- at least one cut-out defined completely or partially along the body of said arm,
- an elastic contact zone capable of cooperating with said support element to ensure the gripping thereof in the opening, and
- elastic peripheral zones which extend between this contact zone and the ends of this elastic arm,
- the contact zone having a greater quantity of material than the quantity of material forming each of the peripheral zones thereof,
- wherein the contact zone comprises at least two inclined beams arranged in a main cut-out of said at least one cut-out defined completely or partially along the body of the elastic arm.

2. The elastic securing organ according to claim 1, wherein the at least two beams of the contact zone interconnect the outer and inner peripheral walls.

3. The elastic securing organ according to claim 1, wherein the main cut-out has an essentially semi-circular shape.

4. The elastic securing organ according to claim 1, wherein a main cut-out is divided into at least three crossed-out parts by said at least two beams.

5. The elastic securing organ according to claim 4, wherein at least two crossed-out parts from said at least three crossed-out parts have substantially similar volumes.

6. The elastic securing organ according to claim 1, wherein a crossed-out part comprised entirely in the contact zone has a volume which is substantially less than that of other crossed-out parts of the main cut-out.

7. The elastic securing organ according to claim 4, wherein said at least three crossed-out parts have substantially similar volumes.

8. The elastic securing organ according to claim 1, wherein central axes of the beams form acute angles with a longitudinal axis of the elastic arm.

9. The elastic securing organ according to claim 1, wherein the at least one cut-out comprises a single cut-out which is a main cut-out.

10. The elastic securing organ according to claim 1, wherein the at least one cut-out comprises a main cut-out and additional cut-outs defined at the ends of this main cut-out.

11. The elastic securing organ according to claim 1, wherein the outer and inner peripheral walls have different shapes.

12. The elastic securing organ according to claim 1, wherein the outer and inner peripheral walls respectively have essentially circular and triangular shapes.

13. The elastic securing organ according to claim 1, wherein it comprises an attachment point with the horological component.

14. The elastic securing organ according to claim 1, wherein it is a collet for fastening the horological component to a support element.

15. The elastic securing organ according to claim 1, wherein it is made of a silicon-based material.

16. An assembly for a horological movement of a timepiece comprising:

an elastic securing organ-horological component according to claim 1, wherein said component is fastened to the support element.

17. A horological movement comprising at least one assembly according to claim 16.

18. A timepiece comprising at least one horological movement according to claim 17.

* * * * *